United States Patent [19]
Amerman

[11] Patent Number: 5,590,715
[45] Date of Patent: Jan. 7, 1997

[54] UNDERGROUND HEAT EXCHANGE SYSTEM

[76] Inventor: Thomas R. Amerman, 726 Montclair, Sugar Land, Tex. 77478

[21] Appl. No.: 527,114

[22] Filed: Sep. 12, 1995

[51] Int. Cl.$^6$ .............................. E21B 33/13; F28D 20/00
[52] U.S. Cl. ......................... 166/290; 165/45; 166/302; 166/57
[58] Field of Search .................... 166/57, 302, 290, 166/89.2, 380, 242.2, 242.3; 62/260; 165/45; 60/398

[56] References Cited

U.S. PATENT DOCUMENTS

| | | | |
|---|---|---|---|
| 2,251,916 | 8/1941 | Cross | 299/5 |
| 3,030,086 | 4/1962 | Donaldson et al. | 175/212 |
| 3,249,162 | 5/1966 | Brown | 175/96 |
| 3,312,296 | 4/1967 | Paramore et al. | 175/72 |
| 3,489,222 | 1/1970 | Millhone et al. | 166/290 |
| 3,525,406 | 8/1970 | Hart | 175/26 |
| 3,878,686 | 4/1975 | Hageman et al. | 405/264 |
| 3,979,917 | 9/1976 | Crafton | 405/138 |
| 4,084,648 | 4/1978 | Yahiro et al. | 175/67 |
| 4,286,651 | 9/1981 | Steiger et al. | 165/45 |
| 4,448,237 | 5/1984 | Riley | 165/2 |
| 4,493,592 | 1/1985 | Knox | 405/225 |
| 4,595,059 | 6/1986 | Katagiri et al. | 166/290 |
| 4,661,018 | 4/1987 | Kinnan | 405/178 |
| 4,662,448 | 5/1987 | Ashford et al. | 166/290 |
| 4,715,429 | 12/1987 | Mogensen | 165/45 |
| 4,905,777 | 3/1990 | Spies | 175/73 |
| 4,909,323 | 3/1990 | Hastings | 166/242.3 |
| 4,927,294 | 5/1990 | Magnani et al. | 405/177 |
| 4,964,474 | 10/1990 | Poesch | 175/74 |
| 4,981,396 | 1/1991 | Albertson et al. | 405/178 |
| 4,993,483 | 2/1991 | Harris | 165/45 |
| 5,040,926 | 8/1991 | Andreasson | 405/232 |
| 5,244,037 | 9/1993 | Warnke | 165/104.31 |
| 5,244,046 | 9/1993 | Council et al. | 166/380 |
| 5,261,251 | 11/1993 | Galiyano | 62/176.6 |
| 5,435,387 | 7/1995 | Roberts | 166/242 |
| 5,435,395 | 7/1995 | Connell | 166/384 |
| 5,452,853 | 9/1995 | Shook et al. | 239/7 |
| 5,454,419 | 10/1995 | Vloedman | 166/277 |
| 5,477,914 | 12/1995 | Rawlings | 165/45 |
| 5,533,356 | 7/1996 | DeMasters | 165/45 |

OTHER PUBLICATIONS

"Grout Placement Methods," Chapter 4 of Grouting Procedures For Ground Source Heat Pump Systems, Eckhart, 1991.
"Driscopipe 5300 Climate Guard System," Phillips Driscopipe, Inc. 1994.
U.S. PTO Official Gazette entry for U.S. Patent 5,427,154; Jun. 27, 1995; p. 2218.

Primary Examiner—Stephen J. Novosad
Attorney, Agent, or Firm—Guy McClung

[57] ABSTRACT

The present invention discloses a system and method for simultaneously installing a pipe loop and a grout pipe in a wellbore. In another aspect such a system is then used to grout the wellbore by releasing the grout pipe from the pipe loop or from a bottom member connected with the pipe loop and then introducing grout through the pipe into the wellbore as the grout pipe is removed upwardly from the wellbore. In another aspect a drilling-grouting system is provided with which while one hole is being drilled a previously-drilled hole is being grouted.

20 Claims, 4 Drawing Sheets

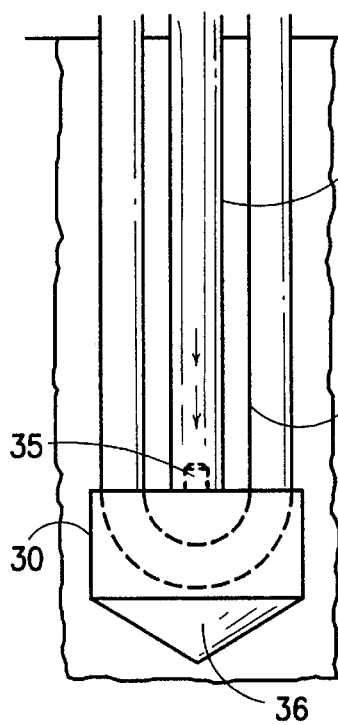
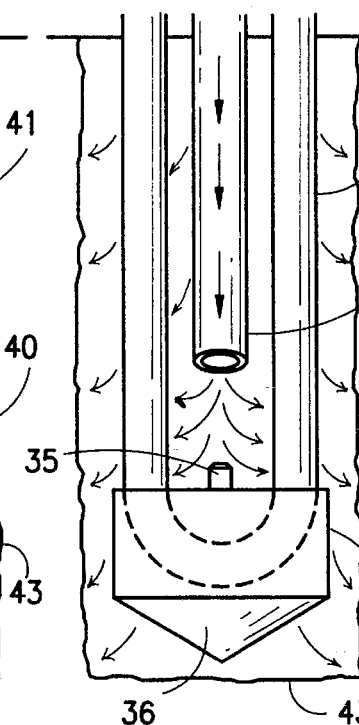
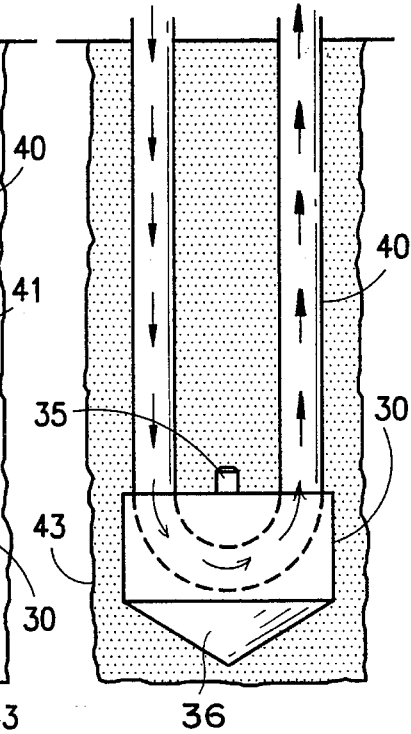
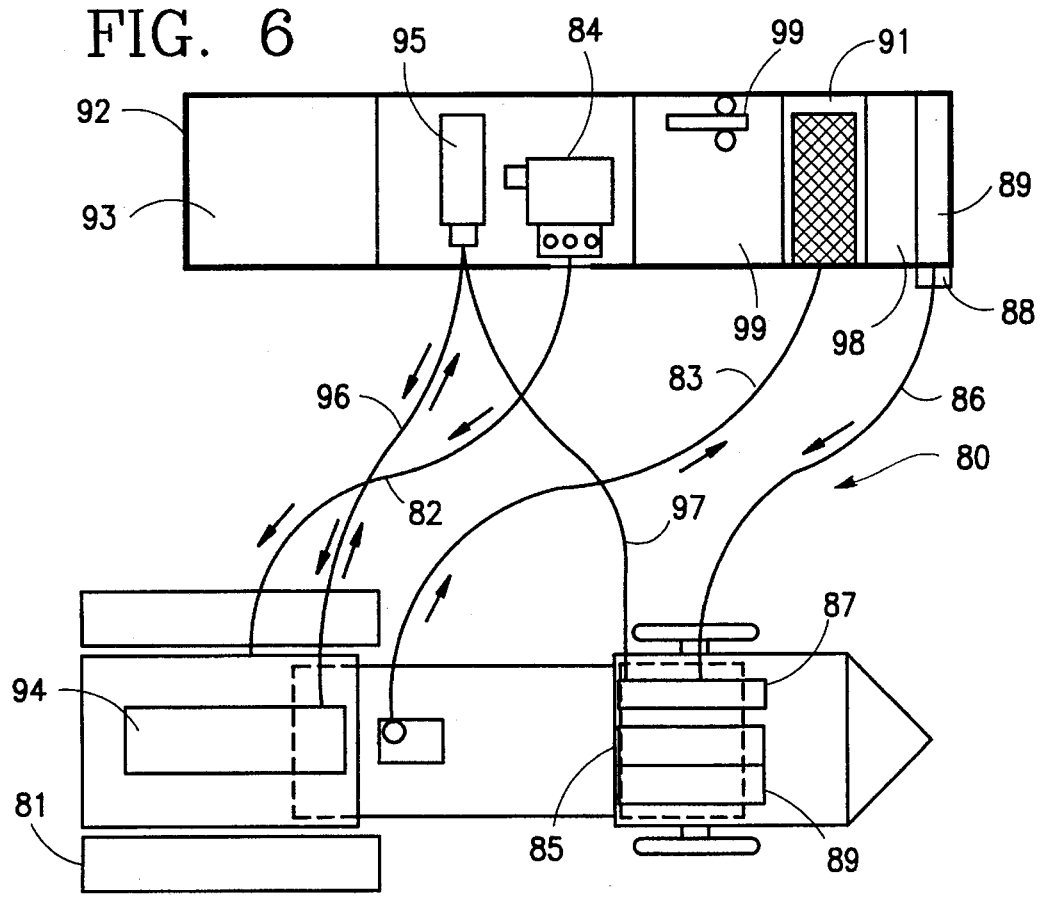

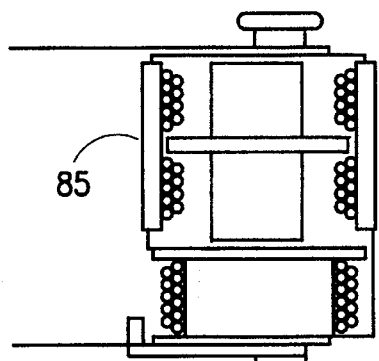
FIG. 7A
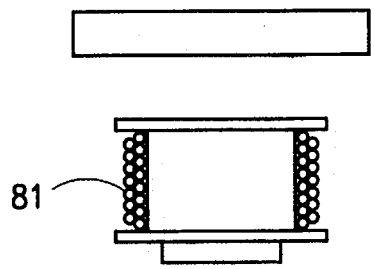
FIG. 7C
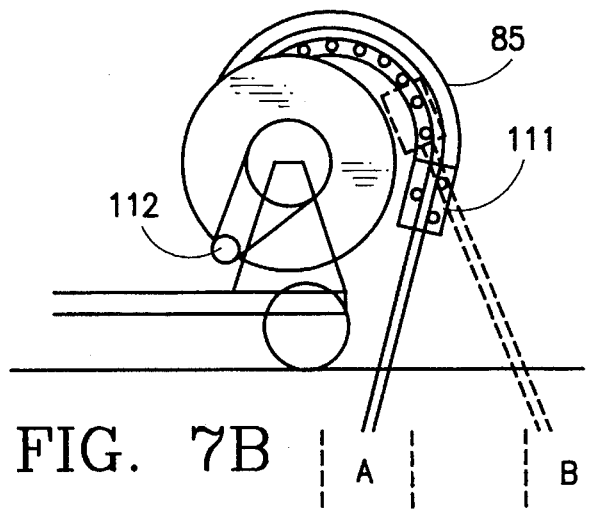
FIG. 7B
FIG. 8A
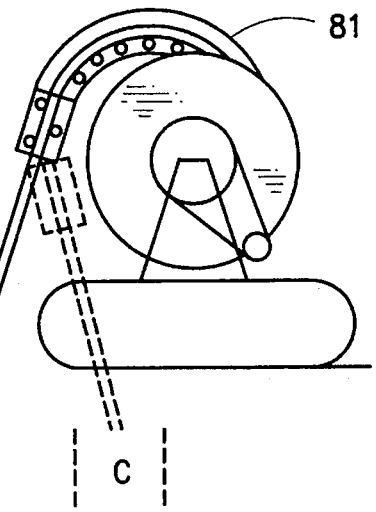
FIG. 7D
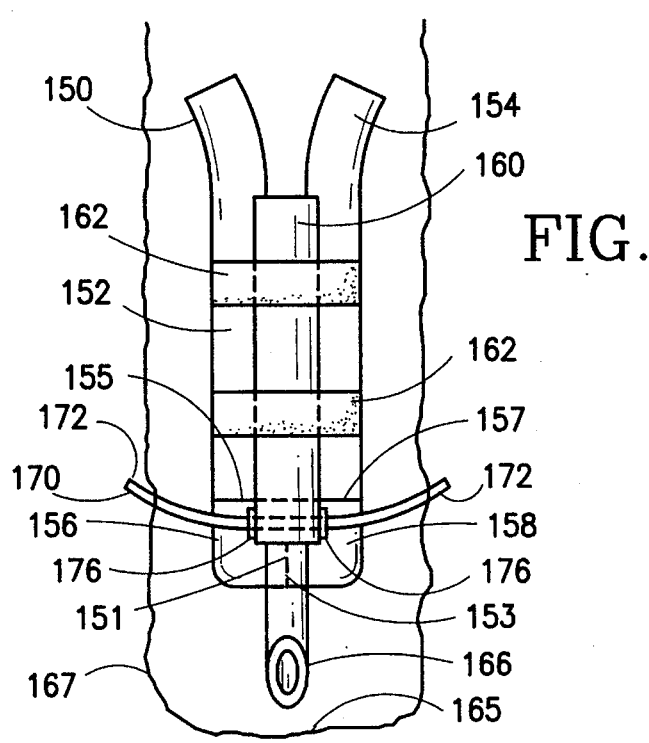
FIG. 8B
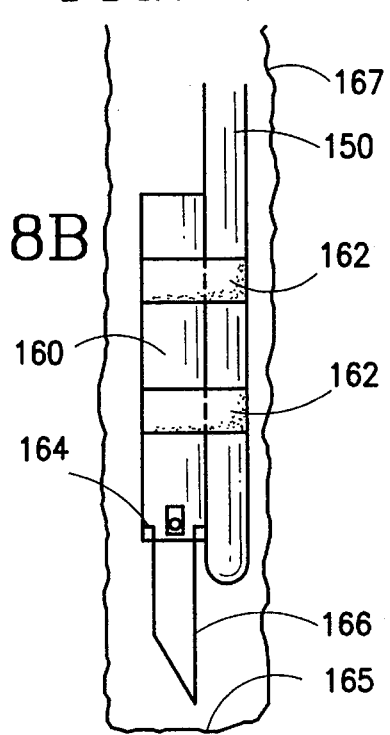

UNDERGROUND HEAT EXCHANGE SYSTEM

BACKGROUND OF THE INVENTION

1. Field of the Invention

The present invention is directed to underground heat exchange systems and to apparatus and methods for installing a loop of pipe in a hole in the earth.

2. Description of Related Art

The prior art discloses a variety of systems and apparatuses for installing ground heat exchange pipe loops in a wellbore. In certain prior art systems a wellbore is drilled, e.g. a drill rig drills a vertical four to four-and-a half inches in diameter hole, e.g. to a depth of about 250 feet. In one aspect a single piece of polyethylene pipe attached to a sinker bar is introduced into the hole and then pulled out of the hole manually while grout is introduced into the hole. In another aspect a polyethylene pipe loop is pushed to the bottom of the hole by a wire-line retrievable sinker bar. When the sinker bar is removed, a series of 2 inch PVC tremmie pipes are screwed together and lowered to the bottom of the hole. A bentonite clay mixture called grout is then batch mixed at the surface and pumped into the tremmie pipe. As each batch is pumped into the hole the tremmie pipe string is raised and one 20 foot section of pipe is removed from the hole and laid on the ground. When the hole is filled to the surface and all of the tremmie pipe has been removed the drill rig is moved to another drilling position, usually at least 15 feet away. When all of the pipe loops have been installed (e.g. one loop for each ton of heating and cooling equipment), the drill rig is removed from the site. A trench (e.g. about four feet deep) is then dug to contain pipes that interconnect all of the pipe loops. Once the trenching is completed the connecting pipe is laid into the trench and heat fused to each of the vertical pipe loops. The connection pipe is then pressure tested and buried and becomes a circulating manifold which carries water between the earth and a heat pump located within an adjacent building. The trenching and manifolding of the surface pipe typically takes as much time as the wellbore drilling and pipe installation.

The prior art discloses numerous in-ground heat exchanger systems (e.g. see U.S. Pat. Nos. 5,244,037; 5,261,251); and grouting systems (see, e.g. U.S. Pat. No. 5,435,387).

SUMMARY OF THE PRESENT INVENTION

The present invention, in one embodiment, discloses a system for simultaneously installing a heat exchange fluid pipe loop and a grouting pipe in a wellbore. The system, in one embodiment, has a bottom member to which both pipes are attached and to which the grouting pipe is releasably attached. The bottom member may be of sufficient mass itself or it may have weights connected thereto so it will easily move down the wellbore. In another embodiment an integral loop of pipe is used with an inlet pipe secured to one side of the loop and an outlet pipe secured to the other side of the loop.

In one aspect the bottom member has an inlet connection and an outlet connection to which are secured inlet and outlet pipe of the pipe loop. A passageway through the bottom member provides for fluid communication between the inlet and outlet pipes so that heat exchange fluid may flow down the inlet pipe, through the passageway in the bottom member, and up through the outlet pipe.

In one aspect such a bottom member has a hole in which the grouting pipe is held. Pulling on the grouting pipe releases it from the bottom member for removal from the wellbore as grout flows out from the bottom of the grouting pipe.

In certain embodiments the grouting pipe is made of commercially available coiled tubing, e.g. in one aspect with an inside diameter of about one and three-tenths inches and an outside diameter of about one and a half inches; and the pipe loop is, e.g., three quarters of an inch in inside diameter made of high density polyethylene. In certain embodiments a wellbore for such heat exchange systems is three to three-and-a-half inches in diameter. In one aspect the bottom member is made of plastic and is pointed to facilitate its downward movement in the wellbore.

In one system and method according to the present invention a coiled tubing unit (CTU) is used to drill heat loop bore holes. The CTU has a reel on which is wrapped continuous flexible steel tubing, an injector which transports the tubing into and out of the hole, a drill bit on the end of a down hole motor, and a pump which supplies fluid for drilling. The motor is rotated by the pump pressure from the surface, which allows the unit to drill without rotating the drill string. This feature results in several benefits not possible with conventional drilling rigs. Directional drilling allows multiple wells to be drilled from one location. It also reduces the space required between bore holes and allows them to be drilled in a very close proximity to the subject building. This process not only reduces 80 percent of trenching on some jobs, but allows the unit to drill under existing slabs, driveways, parking lots and buildings. The compact design and directional drilling capabilities opens the retrofit market to geothermal systems.

With a method according to the present invention a relatively short surface trench is excavated before drilling is started. The drilling machine straddles the trench, drilling bore holes in the bottom of the trench as it moves over the length of the trench. A solids control system which cleans the drilling fluid as it is pumped from the hole, allowing cuttings to be dry discharged in a designated area, thereby maintaining a clean, dry drill site. As each hole is drilled, a track mounted rig moves approximately two to three feet down the trench to the next drilling location. A grout reel is then positioned over the previously drilled hole. This reel has a flexible grout pipe wrapped around a powered reel. As the grout pipe is pushed down the bore hole, it takes a plastic heat loop with it to the bottom of the hole. In certain preferred embodiments the loop is secured in the hole with an anchor apparatus; then the grout pipe is retracted while filling the hole with grout. Since a sinker bar is not required in this process, a 3 to 3¼ inch diameter hole is drilled, in certain embodiments, compared to a conventional 4 to 4½ inch hole. This results in faster penetration, improved fuel efficiency, and improved heat transfer to the earth.

After installation of heat loops in multiple adjacent holes, the loops are heat fused into a common manifold. A return line to a facility or building is attached to the manifold and purged of all remaining air. The system is then pressure tested before being attached to a heat pump.

This invention provides these benefits: shorter surface trench and dry discharge results in less site damage; smaller bore hole increases system efficiency by improved heat transfer; total system installation time is reduced by at least 50 percent as compared to some prior art methods; and usable space is increased by drilling under slabs and other surface structures.

The U.S. Department of Energy states in a recent report that a system with these capabilities is needed to meet its goal of 400,000 installations by the year 2000.

It is, therefore, an object of at least certain preferred embodiments of the present invention to provide:

New, useful, unique, efficient, nonobvious devices and methods for systems and methods for installing heat exchange pipe loops in wellbores; for grouting such wellbores; and for drilling such wellbores;

Such systems including a bottom member to which a pipe loop and a grouting pipe are secured, the bottom member for releasably holding the grouting pipe, the bottom member for facilitating entry of the pipes into the wellbore; and Heat exchange systems with a plurality of heat exchange pipe loops drilled relatively close to each other with simultaneous grouting of one wellbore while another wellbore is being drilled.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIGS. 5A–5C are side schematic views of a system according to the present invention.

FIG. 6 is a top schematic view of a system according to the present invention.

FIG. 7A is a top schematic view of the grouting unit of the system of FIG. 6. FIG. 7B is a side view of the grouting unit of FIG. 7A. FIG. 7C is a top view of the drilling unit of the system of FIG. 6. FIG. 7D is a side view of the drilling unit of FIG. 7C.

FIG. 8A is a front view of a pipe heat exchange loop and related items according to the present invention. FIG. 8B is a side view of the items of FIG. 8A.

DESCRIPTION OF EMBODIMENTS PREFERRED AT THE TIME OF FILING FOR THIS PATENT

Figures 1, 2:
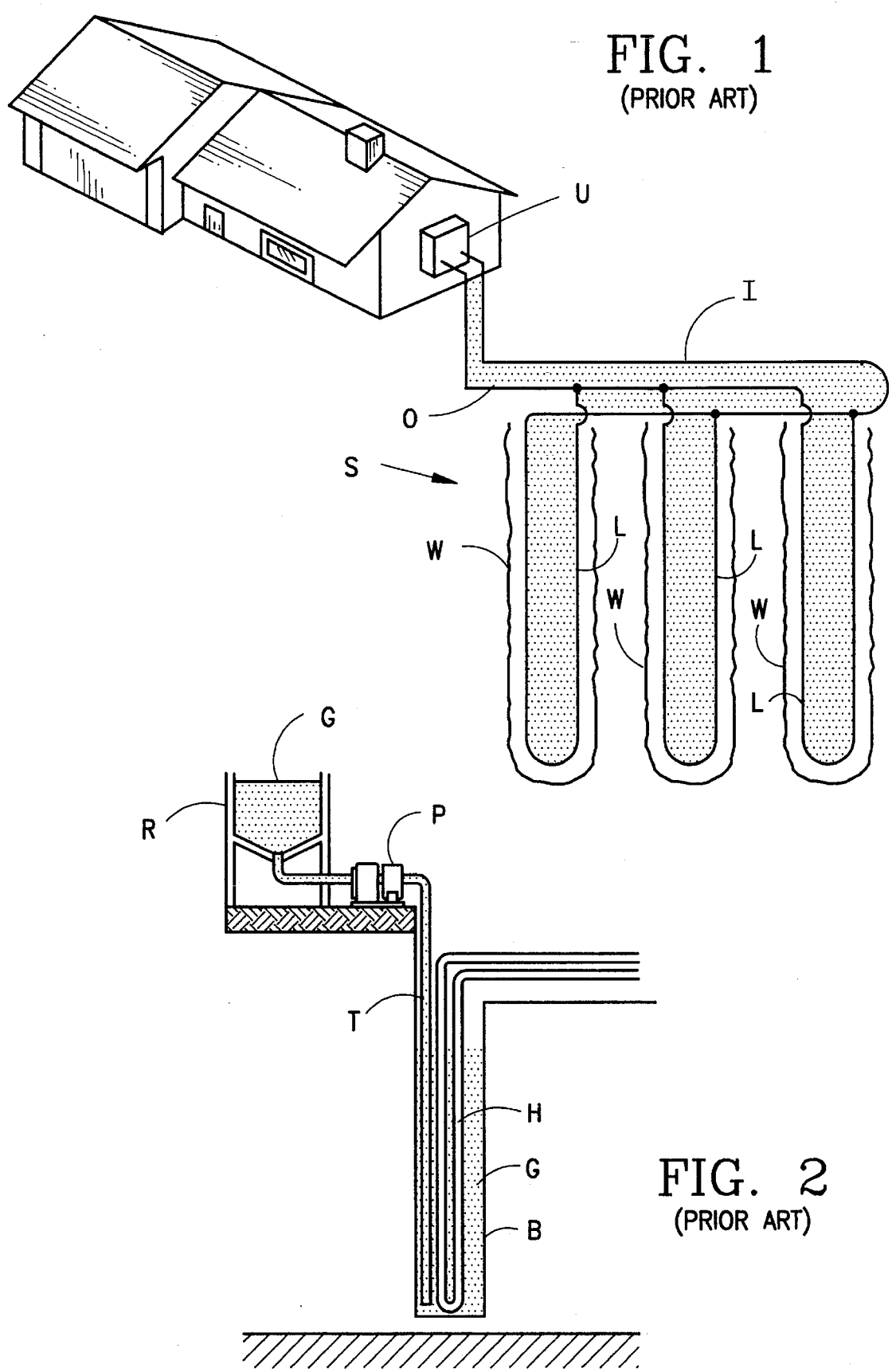
FIG. 1 is a schematic view of a prior art underground pipe loop heat exchange system.
FIG. 2 is a schematic view of a prior art wellbore grouting system.

Referring now to FIG. 1, a prior art underground heat exchange pipe loop system S has a plurality of wellbores W, each e.g. about 250 feet deep and 4 to 4.5 inches in diameter, which are preferably, between about ten feet to fifteen feet apart. Water flows from a building's processing unit U in an inlet pipe I into each inlet side of a plurality of pipe heat exchange loops L and then flows up in each outlet side of the loops L to an outlet pipe O which is in fluid communication with the processing unit U. Pipes I and O are typically about 45 feet long for a three loop system as shown (preferably about ten to fifteen feet between each loop).

FIG. 2 illustrates a prior art system and method for grouting a wellbore such as the wellbores W in FIG. 1. After a pipe heat exchange loop H is installed in a wellbore B, a grout pipe T is inserted into the wellbore B. A grout pump P then pumps grout G from a reservoir R down the grout pipe T from which it flows into the wellbore B.

Figure 3:
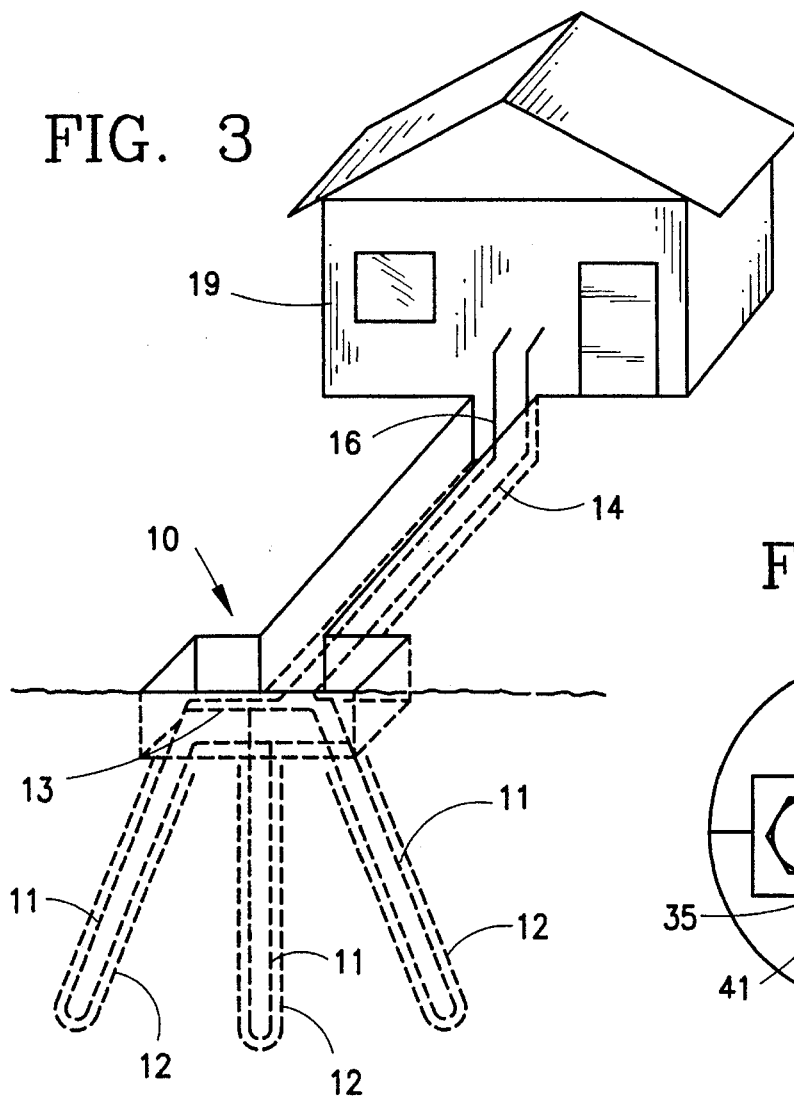
FIG. 3 is a schematic view of an underground pipe loop heat exchange system according to the present invention.

FIG. 3 shows a system 10 according to the present invention which has a plurality of wellbores 12; a water inlet pipe 14; and a water outlet pipe 16. The system includes a processing unit (not shown, like the unit U, FIG. 1), e.g. with pump(s), controller(s), a heat exchanger, and a compressor. The processing unit makes heated air or cooled air available to an adjacent facility or building such as a residential home 19. A manifold 13 interconnects heat loops 11 in the wellbores 12.

In one embodiment the wellbores 12 are about two to three feet apart at the surface. The length of the pipes 14 and 16 depend on the distance of the facility from the wellbores. Both the system S (FIG. 1) and the system 10 (FIG. 3) provide about 3 tons of air conditioning. Typically a 250 foot wellbore is required for each ton of operating capacity. One three ton unit according to this invention has three 250 foot wellbores each with a 500 foot (250 feet down, 250 feet up) heat loop.

Figure 4A:
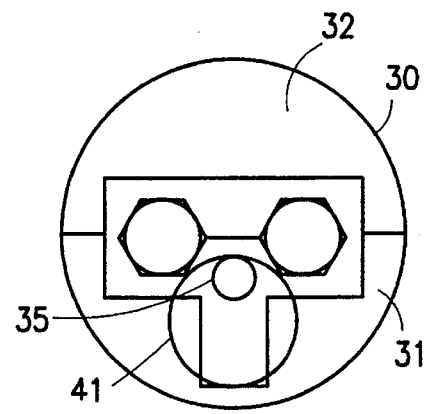
FIG. 4A is a top view of a bottom member according to the present invention.
Figure 4B:
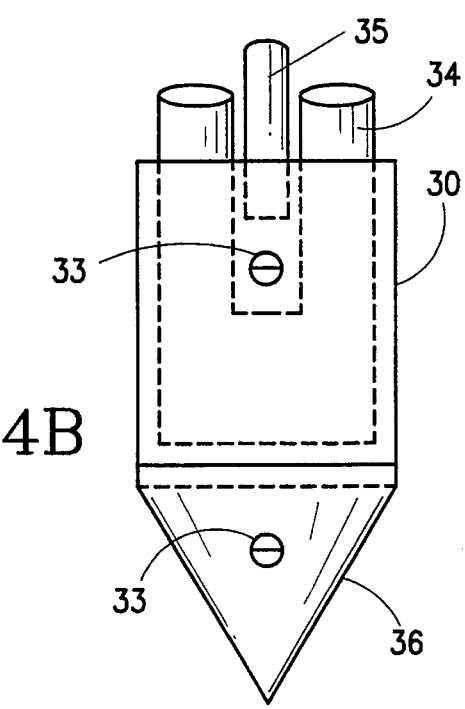
FIG. 4B is a side view of the bottom member of FIG. 4A.

FIGS. 4A and 4B illustrate a bottom member 30 according to the present invention which includes two similar halves 31 and 32 which are secured together with bolts 33 to hold a loop of pipe 34. A rod 35 projecting upwardly from the bottom member 30 is sized to receive and hold a grout pipe slipped loosely over the rod 35. In one aspect the grout pipe is filled with grout as the device is moved down into a wellbore. An end 36 of the bottom member 30 is pointed to facilitate its entry into and movement through the wellbore. In one aspect drilling fluid is circulating down through the grout pipe to facilitate lowering of the entire assembly to the bottom of a hole. In one aspect the grout pipe 41 fits around the rod 35 with a loose fit, allowing drilling fluid to be circulated down through the grout pipe 41, around the rod 35, and out into the wellbore.

FIGS. 5A–5C illustrate one system and method according to the present invention. A bottom member 30 with a pipe loop 40 (heat loop) secured therein and a grouting pipe 41 releasably secured thereto is moved down into a wellbore 43 (FIG. 5A). Once the bottom member 30 reaches the bottom of the wellbore 43, the grouting pipe 41 is pulled off the rod 35 and grout is pumped down the grouting pipe 41 and into the wellbore 43, surrounding the pipe loop 40 and the bottom member 30 (FIG. 5B). The grouting pipe 41 is removed from the wellbore 43 and the pipe loop 40 is grouted in place (FIG. 5C).

In one aspect the grouting pipe 41 is filled with drilling fluid as it is moved to the bottom of a wellbore. Once the grouting pipe 41 is released from the bottom member 30, the drilling fluid in the grouting pipe 41 is displaced out from the grouting pipe 41 and up into the annulus between the heat loop and the wellbore's interior as grout is pumped down into the grouting pipe 41. When an amount of grout sufficient to encapsulate the pipe heat exchange loop in the wellbore (either entirely or portion(s) thereof) has been pumped into the wellbore and/or grouting pipe, then drilling fluid is again pumped down into the grouting pipe 41 to push all grout out from the grouting pipe 41 so grout does not set up in the grouting pipe 41.

FIGS. 7A–7D illustrate the grouting unit 85 and the drilling unit 81 of the system 80 (FIG. 6). As shown in FIGS. 7B and 7D, after the drilling unit 81 has drilled a wellbore A, a grouting assembly according to the present invention is introduced into the wellbore A by a drive 111 of the grouting unit 85. Simultaneously the drilling unit 81 is moved to drill wellbore B (shown in dotted lines, FIG. 7B). Upon the completion of the drilling of wellbore B a drive 112 removes the grouting assembly from the wellbore A and then upon completion of the grouting of wellbore A, the drilling unit 81 is pivoted to begin drilling wellbore C (shown in dotted lines, FIG. 7D) while the grouting unit 85 is pivoted to begin grouting wellbore B.

FIG. 6 illustrates a drilling-grouting system 80 according to the present invention. A drilling unit 81 has flow lines 82 and 83 through which a triplex pump 84 on a trailer 92 pumps motive drilling fluid to energize a downhole drilling motor (not shown) on coil tubing 94 of the drilling unit 81. A grouting unit 85 has a flow line 86 through which a Moyneaux (or progressive cavity) pump 88 pumps grout from a grout reservoir 89 into a wellbore (not shown) beneath the drilling unit 81. A shale shaker 91 is used to clean the drilling fluid used by the drilling unit 81. Drilling and tube units transport space 93 is provided for storing and transporting equipment. An hydraulic power unit 95 provides power for the drilling unit 81 via line 96 and for the grouting unit 85 via a line 97. A mud mixing tank 98 is in communication with an active mud system and is used when new drilling fluid is blended. A desilter 99 is provided for removing very fine solids from the drilling fluid. The grouting unit 85 includes a grout pipe reel 87 and a heat loop reel 89.

FIGS. 8A and 8B show one embodiment of a system 150 according to the present invention. A first hollow elbow 156 made from polyethylene with a wall thickness of about 0.113 inches has a side opening 151 which is fused to a side opening 153 of a second hollow elbow 158. A first polyethylene pipe 152 is fused to a top opening 155 of the first elbow 156 and a second polyethylene pipe 154 (e.g. three quarters of an inch in inside diameter, 1.1 inches in outside diameter) is fused to a top opening 157 of the second elbow 158. Heat exchange fluid, e.g. but not limited to water, is flowable down through the first pipe 152, through the first elbow 156, through the second elbow 158, and then up through the second pipe 154, or vice versa. Pieces of tape 162 secure a piece of pipe 160 (made, e.g., of PVC). a grouting pipe (not shown) is inserted down into the pipe 160 so that it abuts a top shoulder 164 of a pointed pipe 166 secured in the pipe 160. The pipe 166 is pushed down a wellbore 167. As the system 150 is inserted into the wellbore 167, a bendable anchor 170 with one or more arms 172 moves into the wellbore with the system 150. On one aspect the anchor is made of plastic. In one aspect such an anchor 170 has two arms 172 and is a single piece of plastic tubing or rod half an inch thick which extends through holes 174 in the pipe 160. Lock washers 176 facilitate securement of the anchor 170 in place. An upward pull on the system 150 spreads the arms 172 and forces them into the earth around the wellbore 167, thereby anchoring the system 150.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. Apparatus for simultaneously introducing a loop of heat exchange pipe and a grout pipe into a wellbore, the apparatus comprising a body member securable to a heat exchange pipe loop, releasable means on the body member for holding and from which a grout pipe is selectively releasable, and the body member with the heat exchange pipe loop and grout pipe connected thereto introducible into a wellbore and movable to a point in the wellbore at which point the grout pipe is releasable from the body member.

2. The apparatus of claim 1 wherein the body member comprises two pieces securable around the heat exchange pipe loop.

3. The apparatus of claim 1 wherein the body member is a hollow member with a fluid flow channel therethrough an inlet opening, and an outlet opening, and the heat exchange pipe loop includes an inlet pipe and an outlet pipe, the inlet pipe in fluid communication with the inlet opening of the body member and the outlet pipe in fluid communication with the outlet opening so that fluid flows through the inlet pipe, through the body member, and then into the outlet pipe.

4. The apparatus of claim 1 wherein the releasable means on the body member comprises a rod about which the grout pipe is emplaced and from which the grout pipe is releasable.

5. The apparatus of claim 1 wherein the releasable means of the body member comprises a tubular member into which the grout pipe is insertable and from which the grout pipe is releasable.

6. The apparatus of claim 1 further comprising
anchor means connected to the body member for anchoring the apparatus in a wellbore.

7. The apparatus of claim 6 wherein
the anchor means comprises at least one arm extending from the body member, the at least one arm movable with the body member into a wellbore, and the at least one arm anchorable in earth around the wellbore.

8. The apparatus of claim 1 further comprising
a grout pipe connected to the body member.

9. The apparatus of claim 1 further comprising
a heat exchange loop connected to the body member.

10. Apparatus for simultaneously introducing a loop of heat exchange pipe and a grout pipe into a wellbore, the apparatus comprising
a body member securable to a heat exchange pipe loop,
releasable means on the body member for holding and from which a grout pipe is selectively releasable, and
the body member with the heat exchange pipe loop and grout pipe connected thereto introducible into a wellbore and movable to a point in the wellbore at which point the grout pipe is releasable from the body member,
the body member comprises two pieces securable around the heat exchange pipe loop,
the body member is a hollow member with a fluid flow channel therethrough an inlet opening, and an outlet opening,
the heat exchange pipe loop includes an inlet pipe and an outlet pipe, the inlet pipe in fluid communication with the inlet opening of the body member and the outlet pipe in fluid communication with the outlet opening so that fluid flows through the inlet pipe, through the body member, and then into the outlet pipe,
the releasable means on the body member comprises a rod about which the grout pipe is emplaced and from which the grout pipe is releasable,
the releasable means of the body member comprises a tubular member into which the grout pipe is insertable and from which the grout pipe is releasable,
anchor means connected to the body member for anchoring the apparatus in a wellbore,
the anchor means comprises at least one arm extending from the body member, the at least one arm movable with the body member into a wellbore, and the at least one arm anchorable in earth around the wellbore,
a grout pipe connected to the body member, and
a heat exchange loop connected to the body member.

11. A system for drilling wellbores and for installing heat exchange pipe loops in the wellbores, the system comprising
apparatus for drilling wellbores,
apparatus for simultaneously introducing a loop of heat exchange pipe and a grout pipe into a wellbore, the apparatus comprising
a body member securable to a heat exchange pipe loop,
releasable means on the body member for holding and from which a grout pipe is selectively releasable, and
the body member with the heat exchange pipe loop and grout pipe connected thereto introducible into a wellbore and movable to a point in the wellbore at which point the grout pipe is releasable from the body member,
apparatus for grouting the wellbores.

12. The system of claim 11 wherein the apparatus for drilling wellbores is pivotable upon completion of drilling of a first wellbore to commence drilling of a second wellbore.

13. The system of claim 12 wherein the apparatus for simultaneously introducing a loop of heat exchange pipe and a grout pipe and the apparatus for grouting are pivotable to grout the second wellbore upon completion of grouting of the first wellbore and removal therefrom of the apparatus for drilling wellbores.

14. The system of claim 13 wherein an opening at a surface of the earth of the first wellbore is about ten feet from an opening at the surface of the earth of the second wellbore.

15. A method for installing a heat exchange pipe loop in a first wellbore, the method comprising
introducing into the first wellbore an apparatus, the apparatus for simultaneously introducing a loop of heat exchange pipe and a grout pipe into a wellbore, the apparatus comprising
a body member securable to a heat exchange pipe loop,
releasable means on the body member for holding and from which a grout pipe is selectively releasable, and
the body member with the heat exchange pipe loop and grout pipe connected thereto introducible into a wellbore and movable to a point in the wellbore at which point the grout pipe is releasable from the body member,
moving the apparatus down to a point within the first wellbore,
releasing the grout pipe from the releasable means on the body member,
removing the grout pipe from the body member and from the first wellbore, and
pumping grout into the first wellbore through the grout pipe as the grout pipe is removed from the first wellbore.

16. The apparatus of claim 1 further comprising
anchor means connected to the body member for anchoring the apparatus in a wellbore.

17. The method of claim 15 further comprising, prior to introducing the apparatus into the first wellbore,
drilling a first wellbore with drilling apparatus.

18. The method of claim 17 further comprising
pivoting the drilling apparatus, and
drilling a second wellbore spaced apart from the first wellbore while the first wellbore is grouted.

19. The method of claim 18 wherein the first wellbore is spaced apart about ten feet from the second wellbore.

20. The method of claim 18 further comprising
pivoting the drilling apparatus from the second wellbore,
commencing drilling of a third wellbore spaced apart from the first and second wellbores, and
grouting the second wellbore while drilling the third wellbore.

* * * * *